United States Patent
Esmond

[15] 3,695,445
[45] Oct. 3, 1972

[54] PLEATED MEMBRANE TRANSFER DEVICE

[72] Inventor: William G. Esmond, Baltimore, Md.

[73] Assignee: Becton, Dickinson and Company, Rutherford, N.J.

[22] Filed: July 31, 1970

[21] Appl. No.: 59,906

Related U.S. Application Data

[63] Continuation-in-part of Ser. No. 818,970, April 24, 1969, Pat. No. 3,585,131.

[52] U.S. Cl.................................210/321, 210/493
[51] Int. Cl. .........................................B01d 31/00
[58] Field of Search..................210/493, 22, 23, 321

[56] References Cited

UNITED STATES PATENTS

| | | |
|---|---|---|
| 3,459,310 | 8/1969 | Edwards....................210/321 |
| 3,396,849 | 8/1968 | Lande et al................210/321 |
| 3,585,131 | 6/1971 | Esmond....................210/321 |

OTHER PUBLICATIONS

Hunt et al., " Laboratory and Clincal Evaluation of a Small Countercurrent Dialyzer, the Miniklung," Trans. Amer. Soc. Artif. Int. Organs, Vol. XIV, 470 pages, June 14, 1968, pages 109– 113 relied on.

*Primary Examiner*—Frank A. Spear, Jr.
*Attorney*—Kane, Dalsimer, Kane, Sullivan and Kurucz

[57] ABSTRACT

This disclosure relates to an exchange device employed in desalination, ultra filtration, in the transfer of heat, the transfer of gas from the gas phase to the liquid phase, or the transfer of gases from the gas phase to another gas phase or the opposite sides of a permeable or permselective membrane, or to the traNsfer of waste products from blood to a suitable rinsing fluid. The exchange device is formed of a plurality of flow sheets or plates which are disposed between intermediate portions of a continuous pleated membrane. The flow plates have flow facilitating means formed therein and are reusable while the membrane is disposable.

10 Claims, 10 Drawing Figures

INVENTOR
WILLIAM G. ESMOND

BY
ATTORNEY

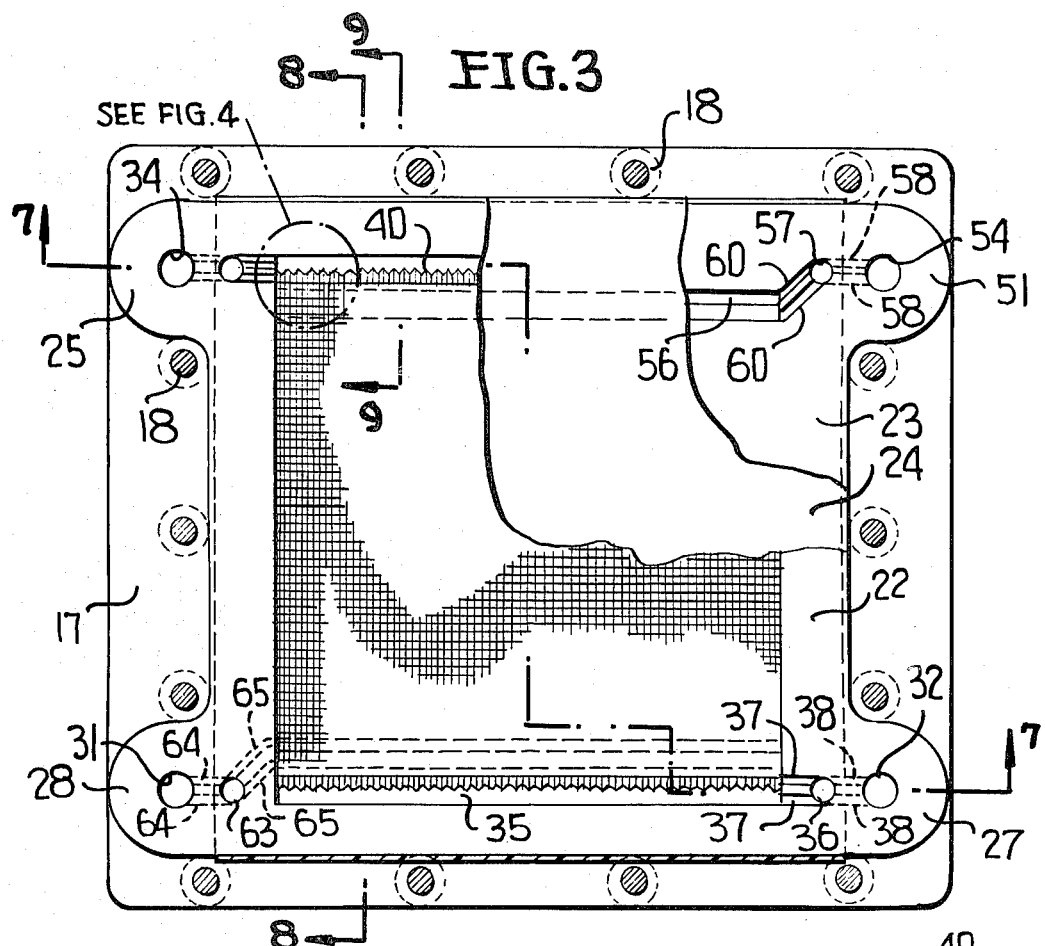

INVENTOR
WILLIAM G. ESMOND

ATTORNEY

PLEATED MEMBRANE TRANSFER DEVICE

This application is continuation-in-part of my copending application Ser. No. 818,970 filed Apr. 24, 1969, entitled pleated membrane exchange device, now U.S. Pat. No. 3,585,131.

This invention relates in general to new and useful improvements in exchange devices, and more particularly to an exchange device which, depending upon the membrane employed therein, may be utilized for the transfer of heat by conduction through the membrane, or when the membrane is permeable, may be provided for the transfer of gas either from a gas phase to a liquid phase or from a gas phase to a gas phase. The device may be used for the cleansing of blood by the transfer of waste products by dialysis or ultrafiltration and osmosis through a suitable membrane to a suitable flowing rinsing solution in which the wastes are washed away.

BACKGROUND

In my copending application Ser. No. 818,970, I have disclosed a pleated membrane exchange device wherein the flow plates are specifically constructed to provide for fluid flow on opposite sides of a membrane in direction substantially normal to one another. While this exchange device has functioned satisfactorily, it has been found that improved results may be obtained by varying the angle of flow of fluid on opposite sides of the membrane.

SUMATION OF THE INVENTION

In accordance with this invention, it is proposed to modify the flow plates of my transfer assembly, as disclosed in my copending application Ser. No. 818,970 so as to provide for more efficient transfer. It has been found that if the angle of fluid flow on opposite sides of a membrane is a slight angle, or the flow is a random flow, more efficient exchange through the membrane is obtainable.

In accordance with a primary form of the invention, it is proposed to obtain random flow by forming at least one of the flow plates with a recessed configuration which is in the form of a plurality of projections arranged in rows and wherein generally diagonal, but random, flow is obtained between an inlet passage along one edge thereof and an outlet passage along a remote edge thereof.

Another feature of this invention is that by forming the flow plate in the manner described above, alternate flow plates may be of a planar surface configuration and the membrane disposed between the two flow plates may be deformed by the pressure of fluid flowing between the membrane and the planar surface flow plate into the surface configuration of the first mentioned flow plate so as to form flow passages on opposite sides of the membrane notwithstanding the fact that one of the flow plates is a planar surface flow plate.

Another feature of the invention is the formation of the flow plates of an exchange device wherein one of the flow plates is a planar surface flow plate and the other of the flow plates is provided with a configurated surface wherein closing of the inlet and outlet passages in the configurated flow plate by the membrane disposed therebetween is prevented by the formation of the entrances of flow passages from the configurated surface into the inlet and outlet passages with fins so as to assure against the collapsing of the membrane within the inlet and outlet passages.

Another feature of this invention is the formation of a pleated member in exchange device utilizing alternately arranged planar surface flow plates and configurated surface flow plates wherein inlet and outlet passages of the planar surface flow plates are disposed inwardly of the respective inlet and outlet passages of the configurated surface flow plates whereby deformation of the membrane due to the high pressure of the fluid flowing along with surfaces of the planar surface flow plates may be assured without the collapsing of the membrane into the inlet and outlet passages of the configurated surface flow plates.

Another feature of this invention is the formation of a flow plate having diagonal flow passages extending between the inlet and outlet passages thereof, the flow passages on opposite surfaces of the flow plate being disposed in crossing relation at a slight angle to one another whereby a plurality of identical flow plates may be utilized.

It is to be understood that in accordance with this invention there is provided an improved transfer device which can be manufactured economically and rapidly by an automatic assembly technique so as to provide single use disposible modules for medical application as membrane oxygenators, heat exchanges, artificial kidneys, gas transfer and oxygen enrichment devices, or reverse osmosis devices for desalination of brackish sea water.

With the above and other objects in view that will hereinafter appear, the nature of the invention will be more clearly understood by reference to the following detailed description, the appended claims and the several views illustrated in the accompanying drawings:

IN THE DRAWINGS

FIG. 3 is a horizontal sectional view taken through the exchange device with portions of the flow plates and membrane being broken away so as to illustrate the details of the various components thereof.

FIG. 4 is an enlarged fragmentary plan view of a corner portion of one of the flow plates and shows specifically the details of the configurated surface thereof, which allows random flow across the surface thereof.

FIG. 5 is an enlarged fragmentary perspective view of one corner of the flow plate of FIG. 4 and shows further the specific details of construction thereof.

FIG. 6 is an enlarged fragmentary plan view similar to FIG. 4 and shows a modified surface configuration.

Figure 1:
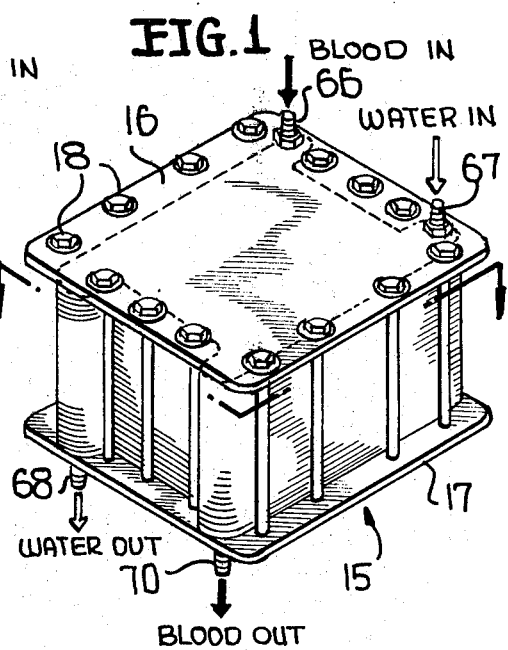
FIG. 1 is a top perspective view of a typical exchange device formed in accordance with this invention.
Figure 2:
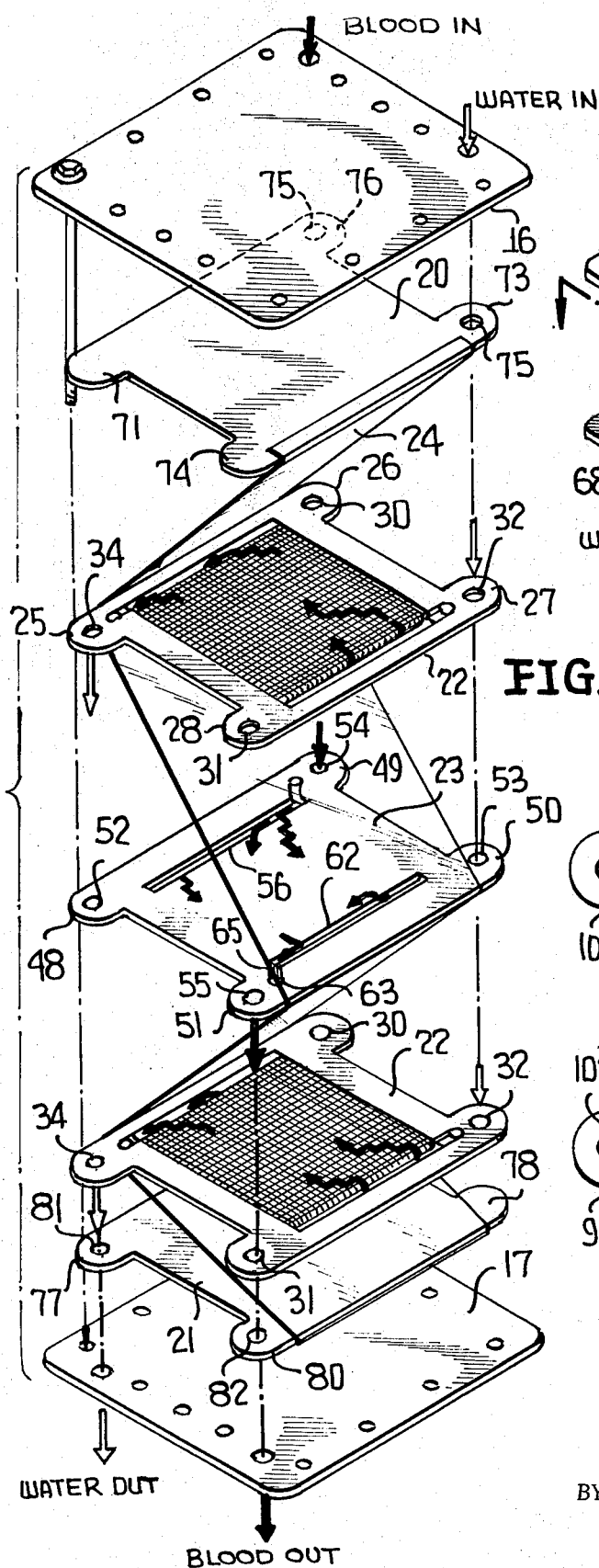
FIG. 2 is an exploded perspective view showing the general construction of the exchange device, only three of the flow plates being shown.

Referring now to the drawings in detail, it will be seen that there is illustrated in FIG. 1 an exchange device formed in accordance with this invention, the exchange device being generally identified by the numeral 15. The exchange device 15, as is best illustrated in FIG. 2, is formed of a pair of remote clamping plates 16 and 17 which are secured together by elongated bolts 18 passing therethrough, as is best illustrated in FIG. 1. The length of the clamping bolts 18 will be in accordance with the desired thickness of the exchange device.

Disposed entirely within the outline defined by the clamping bolts 18 is an exchange stack which includes buffer plates 20 and 21, which oppose the clamping plates 16 and 17, respectively. Adjacent each of the buffer plates 20,21 is a special flow plate formed in accordance with this invention, the flow plate being identified by the numeral 22. The flow plates 22 will be disposed in alternating relation with other special flow plates 23 also formed in accordance with this invention. The flow plates 22 and 23 are separated by a continuous pleated membrane 24 which is interwoven back and forth between the flow plates 22 and 23. The pleated membrane 24 will also extend between the terminal ones of the flow plates 22 and the buffer plates 20,21, and has end portions thereof clamped between the buffer plates 20,21 and their respective clamping plates 16, 17.

As is best shown in FIG. 3, the exchange plate 22 is generally rectangular in outline and is provided with ears 25, 26, 27 and 28 at the opposite corners thereof, these ears projecting from two opposite edges of the flow plate. The ears 26 and 28 have ports 30 and 31 extending therethrough which are not otherwise associated with the flow plate 22. On the other hand, the ear 27 is provided with an inlet port 32 and the ear 25 is provided with an outlet port 34.

The flow plate 22 has formed entirely therethrough an inlet passage 35 which extends along the line between the ports 32 and 31, but terminating short thereof. Intermediate the inlet passage 35 and the inlet port 32 and within the main configuration of the flow plate 22 there is provided a through port 36. On one surface of the flow plate 22 a pair of passages 37 are formed in adjacent parallel relation between the through port 36 and the inlet passage 35. On the opposite surface of the flow plate 22 there are formed a pair of flow passages 38 which are disposed in adjacent parallel relation and which extend between the through port 36 and the inlet port 32.

The construction of the flow plate 22 at the opposite corner thereof is similar, as is best illustrated in FIG. 5. Extending generally in alignment with the ports 30 and 34 is an outlet passage 40 which opens entirely through the flow plate 22. Intermediate one end of the outlet passage 40 and the outlet port 34 is a through port 41. In the same surface of the flow plate 22 in which the passages 37 are formed, a pair of adjacent parallel passages 42 are formed between the outlet passage 40 and the through port 41. On the opposite surface of the flow plate 22 and extending between the through port 41 and the outlet port 34 is another pair of adjacent passages 43.

Between the inlet passage 35 and the outlet passage 40 is a configurated surface 44 which defines a multi-path flow surface. The configurated surface 44 is generally rectangular in outline and is of a width corresponding to the lengths of the inlet passage 35 and the outlet passage 40 and extends entirely therebetween.

In the preferred embodiment of the flow plate 22, the configurated surface 44, which is recessed, is defined by a plurality of pyramids 45 which project normal to the plane of the flow plate 22 and which are arranged in rows, both transversely and longitudinally. It will be readily apparent that random flow between the inlet passage 35 and the outlet passage 40 will occur.

Figure 9:
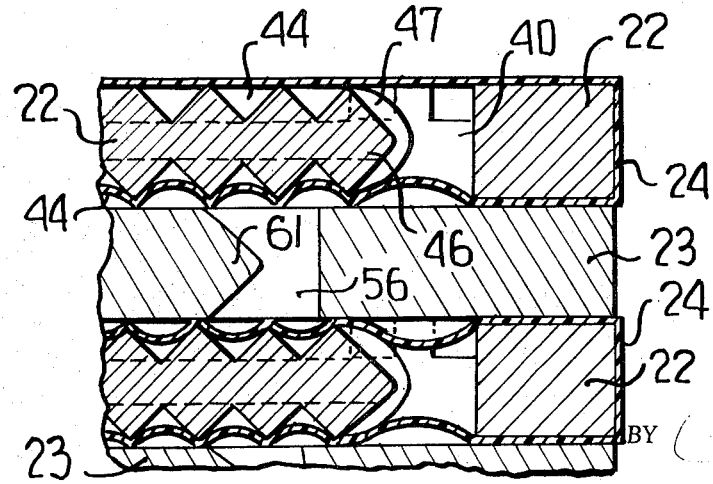
FIG. 9 is an enlarged fragmentary sectional view taken along the section line 9—9 of FIG. 3 and shows the relationship of the inlet or outlet passages of the respective flow plates and the deformation of the membrane between the flow plates and the use of the exchange device.

With particular reference to FIGS. 4 and 9, it will be seen that the cross section of the outlet passage 40 is not rectangular, but that edge portion of the flow plate 22 between the configurated surfaces 44 formed in opposite faces thereof, is slightly pointed as at 46 so as to provided for a gradual merging of the configurated surface 44 into the outlet passage 40. It is also to be noted that associated with the plate projection 46 is a plurality of fins 47 which are disposed normal to the length of the outlet passage 40 and which are spaced longitudinally thereof. These fins 47 are aligned with the rows of projections 45 disposed normal to the length of the outlet passage 40. The fins 47 prevent the collapsing of the membrane 24 into the outlet passage 40 so as to close the same, in a manner to be described hereinafter.

Figure 8:
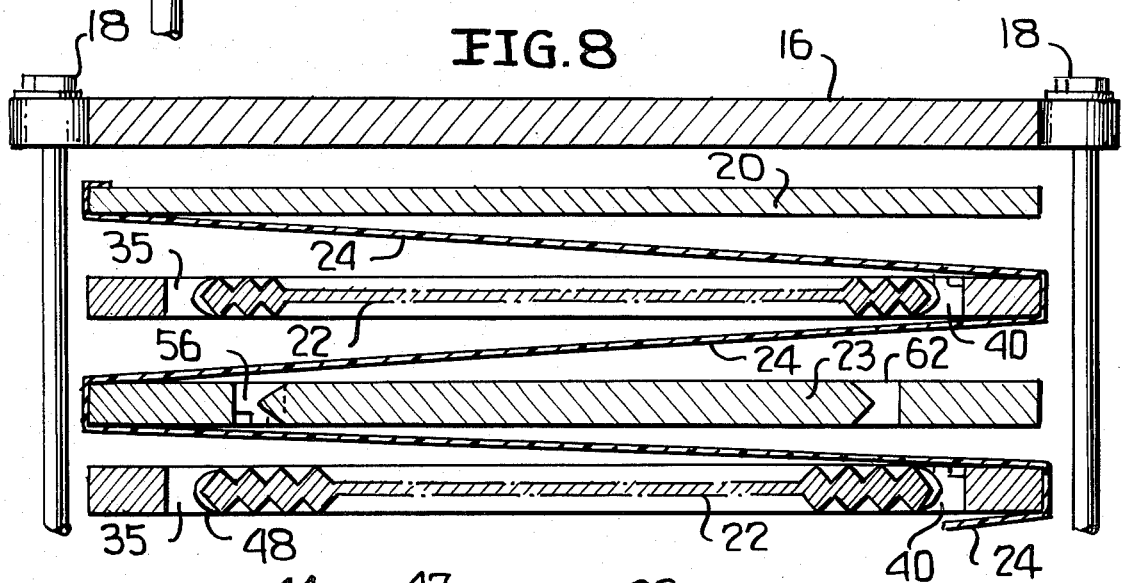
FIG. 8 is a view similar to FIG. 7, but taken along the line 8—8 of FIG. 3 and shows further the details of the flow device.

It is also pointed out here that the construction of the flow plates 22 in the vicinity of the inlet passages 35 is similar and fins 48 project into the inlet passages 35, as is best shown in FIG. 8.

With particular reference to FIG. 6 at this time, it will be seen that there is illustrated a modified form of flow plate which is generally identified by the numeral 122. The flow plate 122 is identical with the flow plate 22 with the exception of the configurated surface 144 formed therein. In lieu of the configurated surface being formed by a plurality of projections in the shape of pyramids, the configurated surface 144 is formed by a plurality of projections arranged in transverse and longitudinal rows, the projections being identified by the numeral 145 and being in the form of part spherical elements. It is to be understood that the various flow passages and ports of the flow plate 122 will be identical with those of the flow plate 22 and are provided with like reference numerals. No further description thereof is believed to be necessary.

With reference to FIGS. 2 and 3, it will be seen that the planar surface flow plates 23 are of the same configuration as the flow plates 22 and include a generally rectangular central portion having ears 48, 49, 50 and 51 projecting from the remote corners thereof. The ears 48 and 50 are provided with through ports 52 and 53 while the ear 49 is provided with an inlet port 54 and the ear 51 is provided with an outlet port 55.

The flow plate 23 is provided with an elongated inlet passage 56 which extends entirely through the flow plate. The inlet passage 36 is offset inwardly of but is disposed parallel to a line between the ports 52 and 54. As it best shown in FIG. 3, the inlet passage 56 is connected to the inlet port 54 by a flow passage arrangement which includes a through port 57 which is communicated with the inlet port 54 by means of a pair of adjacent parallel passages 58 formed in one surface only of the flow plate 23. On the opposite surface only of the flow plate 23 the through port 57 is communicated with the inlet passage 56 by means of a pair of diagonal, closely adjacent, parallel flow passages 60.

With particular reference to FIG. 9, it will be seen that the inlet passage 56 is not of a rectangular cross section, but has a pointed portion 61 of the central part of the flow plate 23 projecting thereinto. This configuration of the inlet passage 56 assures for the gradual flow of fluid between the inlet passage 56 and the membrane 23.

Referring once again to FIG. 2, it will be seen that remote from and parallel to the inlet passage 56, the flow plate 23 is provided with an outlet passage 62. The outlet passage 62 is offset inwardly from the line between the ports 53 and 55 and is in communication with the port 55. Intermediate the port 55 and the outlet passage 62 is a through port 63 which is in communication with the outlet port 55 by means of a pair of parallel passages 64(FIG. 3) formed on the underside of the flow plate 23. On the upper surface of the flow plate 23, the through port 63 is communicated with the outlet passage 62 by a pair of diagonally disposed, closely adjacent, parallel passages 65.

It is to be understood that in the formation of the exchange device 15, as many of the flow plates 22 and 23 desired to form the exchange device are disposed in alternating relation with the membrane 24 disposed therebetween in pleated relation, as is shown in FIG. 2. After the desired stack of the flow plates 22 and 23 and the pleated membrane 24 has been assembled, the buffer plates 20 and 21 are assembled therewith, after which the entire stack is assembled between the clamping plates 16 and 17 and tightly clamped together by means of the clamping bolts 18. In the assembled relation of the flow plates 22 and 23, as it best illustrated in FIGS. 2 and 3, the pleated membrane 24 extends only between the main portions of the flow plates and not between the projecting ears thereof. However, the pleated membrane 24 will be formed of sufficiently thin and deformable material so that when the exchange device 15 is formed, the projecting ears of the flow plates will be in sufficient intimate contact so as to assure against leakage therebetween.

With particular reference to FIGS. 1 and 2, the clamping plate 18 will be provided with, in the case of the use of the exchange device 15 as an artificial kidney with a blood inlet fitting 66 and a water inlet fitting 67. In a like manner, the clamping plate 17 will be provided with a water outlet fitting 68 and a blood outlet fitting 70, the respective outlet fittings being disposed in diagonal relation with respect to the inlet fittings.

The buffer plate 20 is of the same outline as the flow plates 22 and 23 is is provided with four ears 71, 72, 73 and 74. The ears 71 and 74 are imperforate and serve to close the ports 31 and 34 in the adjacent flow plate 22. The ear 72 is provided with a through port 75 and permits flow of blood from the fitting 66 into the port 30 of the adjacent flow plate 22. In a like manner, the ear 73 is provided with a through port 76 which permits the flow of water into the inlet port 32 of the adjacent flow plate 22.

It will be seen that the buffer plate 21 is also of the same outline as the flow plates 22 and 23 and is provided with ears at the four corners thereof, of which one ear is not shown. The ears of the buffer plate 21 include an ear 77, an unillustrated ear, an ear 78 and an ear 80. The unillustrated ear and the ear 78 are imperforate and serve to close the inlet port 32 and the through port 30 formed in the adjacent flow plate 22. The ear 77 is provided with a through port 81 which permits flow of water out through the outlet fittings 68. The ear 80 is provided with a through port 82 which is aligned with the through port 31 in the adjacent flow plate 22 and permits the outflow of blood through the outlet fittings 70.

Figure 7:
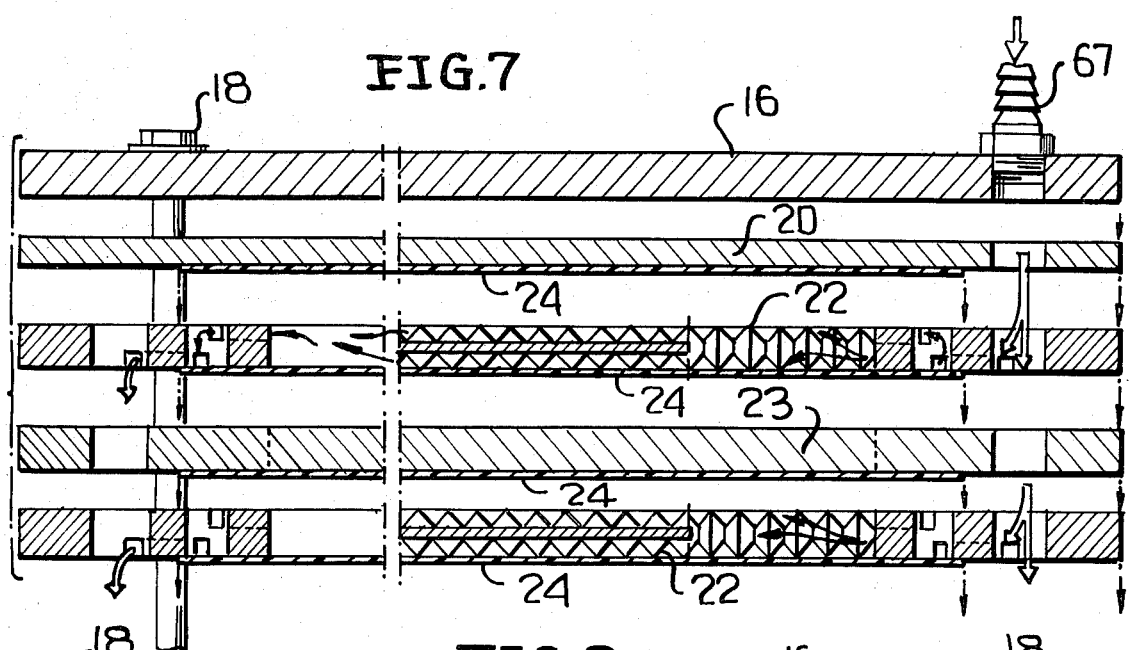
FIG. 7 is an enlarged fragmentary sectional view taken generally along the line 7—7 of FIG. 3 with the elements of the transfer device in separated relation and schematically shows the flow of fluid therethrough.

With particular reference to FIGS. 7, 8 and 9, it will be seen that in the use of the exchange device 15, there will be fluid flow along the opposite faces of the flow plates 22 and 23, with this flow being separated by the pleated membrane 24. The pressure of the fluid flow along the opposite surfaces of the flow plate 23 must be greater than that along the opposite faces of the flow plates 22 so that there will be a deformation of the membrane 24 into the configured surfaces 44 of the flow plates 22, as is best shown in FIG. 9. Because the membrane 24 does deform generally in accordance with this contour of the configurated surfaces 44, it will be seen that a random flow of fluid across the planar surfaces of the flow plates 23 will also be effected. By providing for random flow in cross relation, a maximum transfer between the fluids on opposite surfaces of the membrane 24 may be effected.

It is to be understood that the exchange device, when assembled, is a light weight, pleated membrane, multiple, parallel path with random flow, low flow resistance, pumpless hemodialyzer, or gas exchange device, or heat exchanger which can be easily head in one hand, and the clamping plates may be precision injection molded from glass filled polycarbonate resin or machined from steel or stainless steel. The flow plates 22 and 23 are preferably precision injection molded of polypropylene plastic or silicone rubber or like material to possess a smooth glossy surface with the chemical zeta potential properties ideal for contact with blood.

In a like manner, it is to be understood that the membrane 24 will be varied depending upon the specific purpose of the exchange device. For example, if the exchange device is to be utilized as a dialyzer Bemberg PT 150 Cupraphan membrane may be utilized. On the other hand, if the exchange device is merely a heat exchanger, the membrane may be in the form of a Mylar film, silver or stainless steel foil. On the other hand, if the exchange device is in the form of an artificial lung, the membrane may be a silicone-polycarbonate membrane. The thickness of the membrane will vary between 1 mil and 5 mil.

It is also to be understood that only the membrane 24 is disposible. The flow plates and other components of the exchange device may be readily cleansed and sterilized for reuse.

Figure 10:
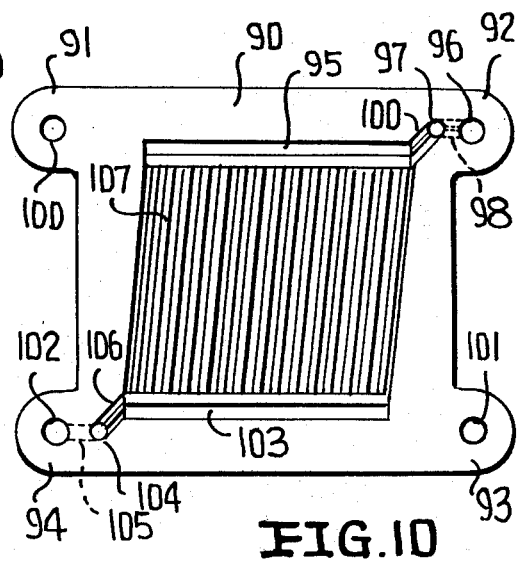
FIG. 10 is a plan view of a modified form of flow plate.

Although a preferred flow is obtainable with the flow plates 22 and 23 with the flow plates 22 and 23 being advantageous in that the flow plate 23 is a planar surface flow plate and may be readily formed, it is to be understood that similar results may be obtained utilizing the flow plate of FIG. 10 which is identified by the numeral 90. The flow plate 90 is of the same outline as the flow plates 22 and 23 and includes a generally rectangular central portion having ears 91, 92, 93 and 94 projecting from the corners thereof.

For descriptive purposes only, a flow passage 95 of the flow plate 90 is described as an inlet passage. The inlet passage 95 extends generally parallel to a line through the centers of the ears 91, 92, but is inwardly offset therefrom. The inlet passage 95 is in communication with an inlet port 96 formed in the ear 92. Between the inlet passage 95 and the inlet port 96 there is a through port 97. The through port 97 is in communication with the inlet port 96 by a pair of parallel, closely spaced flow passages 98 formed on the underside of the flow plate 90. A pair of similar flow passages 100 extend between the through port 97 and the inlet passage 95.

The ear 91 is provided with a through port 100, the ear 93 is provided with a through port 101 and the ear 94 is provided with an outlet port 102. Disposed along a line parallel to the line between the ports 101 and 102, but spaced inwardly thereof is an outlet passage 103. The outlet passage 103 is in communication with the outlet port 102.

Disposed intermediate the outlet port 102 and the outlet passage 103 is a through port 104. Formed on the underside of the flow plate 90 is a pair of closely adjacent parallel grooves 105 which place the through port 104 into communication with the outlet port 102. A pair of similar, but diagonally arranged closely adjacent parallel passages 106 are formed in the upper surface of the flow plate 90 and communicate the outlet passage 103 with the through port 104.

That portion of each surface of the flow plate 90 extending between the inlet passage 95 and the outlet passage 103 is formed with a plurality of shallow grooves or flow passages 107. It is to be noted that these shallow grooves are disposed at an angle to the flow passages 95 and 103 other than 90° so that diagonal flow across the surface of the flow plate 90 will be effected.

The flow passages 107 formed on the underside of the flow plate 90 may be parallel to or in crossing relation to the flow passages 107 on the upper surface thereof.

It is to be understood that when the flow plate 90 is provided, there will be a plurality of such flow plates and that alternating flow plates will be rotated 90° so that the ports 100 and 96 will assume the positions of the ports 102 and 101, respectively. Thus, in each instance, the port 96 will be an inlet port and the port 102 will be an outlet port, but the ports of the alternating flow plates will carry different fluids.

The flow plates 90 will be assembled with a pleated membrane 24, the buffer plates 20, 21 and the clamping plates 16, 17 in the same manner as that illustrated in FIG. 1.

It is to be understood that the flow plate arrangements specifically disclosed in this application provide for more efficient exchange than the flow plates disclosed in my copending application Ser. No. 818,970 and that otherwise the exchange device of this application is of a similar construction and incorporates all of the benefits of the exchange device of my prior application Ser. No. 818,970.

Although only several preferred embodiments of flow plate arrangements have been specifically illustrated and described herein, it is to be understood that minor variations may be made therein without departing from the spirit and scope of the invention, as defined by the appended claims.

I claim:

1. An exchange device including a stack of exchange plates with adjacent plates having opposed surfaces separated by a membrane, at least one plate surface of each pair of opposed surfaces being configured in the form of criss-crossing grooves defining minute projections arranged in rows and the other plate surface of each pair of plate surfaces being planar, there being on opposite sides of each membrane flow passages defined by each membrane in combination with the adjacent pair of plate surfaces, said flow passages along said planar plate surface being defined by the deformation of said membrane into the opposing configured surfaces and said flow passages being configured to provide diagonal flow in crossing relation on opposite sides of each membrane, said minute projections defining said flow passages with said flow passages providing for random flow across said opposed surfaces.

2. The exchange device of claim 1 wherein said criss-crossing grooves define a rectangular grid having an inlet passage along one edge thereof and an outlet passage along an opposite edge thereof, and inlet and outlet ports at diagonally related corners of said grid connected to respective ones of said inlet and outlet passages whereby diagonal flow across said grid is assured.

3. The exchange device of claim 2 wherein certain of said criss-crossing grooves open directly into said inlet and outlet passages with portions of said grooves within and adjacent said inlet and outlet passages being defined by fins aligned with certain of said rows of projections, said fins forming supports for said membrane to prevent closing of said inlet and outlet passages.

4. The exchange device of claim 2 wherein said planar surface plate also has an inlet passage and an outlet passage formed therein, all of said inlet and outlet passages being generally parallel to one another and in offset relation.

5. The exchange device of claim 2 wherein said planar surface plate also has an inlet passage and an outlet passage formed therein, all of said inlet and outlet passages being generally parallel to one another and in offset relation, said planar surface plate and inlet and outlet passages overlie said grid.

6. The exchange device of claim 2 wherein said planar surface plate also has an inlet passage and an outlet passage formed therein, all of said inlet and outlet passages opening entirely through the respective plate, and each of said inlet and outlet passages progressively increasing in depth from the opposite surfaces of the respective plate from a central area of the plate.

7. The exchange device of claim 2 wherein said planar surface plate also has an inlet passage and an outlet passage formed therein, said planar surface plate also having inlet and outlet ports at diagonally related corners thereof connected to remote ends of said inlet and outlet passages whereby diagonal flow across said planar surface is assured, said inlet and outlet ports of a pair of plates being arranged in a generally rectilinear pattern with diagonal flow passages disposed on opposite sides of the membrane disposed therebetween being in crossing relation.

8. The exchange device of claim 1 wherein said projections are in the form of pyramids.

9. The exchange device of claim 1 wherein said projections are part spherical.

10. The exchange device of claim 1 wherein said configurated surface terminates at two opposite ends thereof in an inlet passage and an outlet passage and said configurated surface is in the form of diagonal grooves extending between said inlet and outlet passages.

* * * * *